United States Patent
Inoue et al.

(10) Patent No.: US 12,553,833 B2
(45) Date of Patent: Feb. 17, 2026

(54) VISUAL INSPECTION APPARATUS AND VISUAL INSPECTION METHOD

(71) Applicant: Hitachi Astemo, Ltd., Hitachinaka (JP)

(72) Inventors: Shinichi Inoue, Hitachinaka (JP);
Takateru Seki, Hitachinaka (JP);
Takamasa Imaizumi, Hitachinaka (JP);
Hiroyuki Hayashi, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 190 days.

(21) Appl. No.: 18/685,721

(22) PCT Filed: Jul. 7, 2022

(86) PCT No.: PCT/JP2022/026939
§ 371 (c)(1),
(2) Date: Feb. 22, 2024

(87) PCT Pub. No.: WO2023/026699
PCT Pub. Date: Mar. 2, 2023

(65) Prior Publication Data
US 2024/0353347 A1   Oct. 24, 2024

(30) Foreign Application Priority Data
Aug. 27, 2021   (JP) .................. 2021-138469

(51) Int. Cl.
*G01N 21/88* (2006.01)

(52) U.S. Cl.
CPC . *G01N 21/8851* (2013.01); *G01N 2021/8861* (2013.01); *G01N 2021/887* (2013.01); *G01N 2021/8874* (2013.01)

(58) Field of Classification Search
CPC ....... G01N 21/8851; G01N 2021/8861; G01N 2021/887; G01N 2021/8874
See application file for complete search history.

(56) References Cited

FOREIGN PATENT DOCUMENTS

| JP | 2017-40600 | | 2/2017 | |
|---|---|---|---|---|
| JP | 2017040600 A | * | 2/2017 | ............. G01N 21/88 |
| JP | 2019-15741 | | 1/2019 | |

OTHER PUBLICATIONS

International Search Report issued Sep. 20, 2022 in International Application No. PCT/JP2022/026939 with English translation.

(Continued)

*Primary Examiner* — Jamil Ahmed
(74) *Attorney, Agent, or Firm* — Wenderoth, Lind & Ponack, L.L.P.

(57) ABSTRACT

A visual inspection apparatus detects a defect candidate for each of captured images of a crown surface of a piston that are captured at a plurality of posture angles different from one another, locates a three-dimensional position of the defect candidate based on a two-dimensional position of the defect candidate detected from at least one captured image among the captured images captured at the plurality of posture angles, applies a perspective projection transformation on the three-dimensional position of the defect candidate to acquire a two-dimensional position of the defect candidate for each of the captured images captured at the plurality of posture angles, determines a feature amount regarding the defect candidate based on the two-dimensional position of the defect candidate for each of the captured images captured at the plurality of posture angles, and inspects the crown surface of the piston using the feature amount regarding the defect candidate.

7 Claims, 15 Drawing Sheets

(56) References Cited

OTHER PUBLICATIONS

Written Opinion of the International Searching Authority issued Sep. 20, 2022 in International Application No. PCT/JP2022/026939 with English translation.

* cited by examiner

VIEW 25

VIEW 3

VIEW 2

VIEW 1

VISUAL INSPECTION APPARATUS AND VISUAL INSPECTION METHOD

TECHNICAL FIELD

The present invention relates to a visual inspection apparatus and a visual inspection method.

BACKGROUND ART

PTL 1 discloses a visual inspection apparatus that inspects a scratch or the like on a surface of an inspection target using a photometric stereo method. This visual inspection apparatus captures a plurality of partial illumination images whose illumination directions are different from one another, and calculates a normal vector to the surface of the inspection target at each pixel using a pixel value for each of pixels in a corresponding relationship among images. Then, the visual inspection apparatus performs differential processing on the normal vector at each pixel in an X direction and a Y direction, generates a contour image indicating a contour of an inclination of the surface of the inspection target, and conducts an inspection in an inspection region set on the contour image.

CITATION LIST

Patent Literature

PTL 1: Japanese Patent Application Laid-open No. 2019-15741

SUMMARY OF INVENTION

Technical Problem

The inspection target may be inspected by being imaged at a plurality of posture angles to improve the accuracy of inspecting the inspection target in some cases, but the above-described conventional image inspection apparatus fails to take this possibility into consideration.

Then, when the inspection target is inspected by being imaged at the plurality of posture angles, the inspection accuracy may undesirably reduce if there is an image at an angle where a defect candidate is not detected.

Solution to Problem

One of objects of the present invention is to provide a visual inspection apparatus and a visual inspection method capable of improving inspection accuracy when an inspection target is inspected by being imaged at a plurality of posture angles.

According to one aspect of the present invention, a visual inspection method includes detecting a defect candidate for each of captured images of a surface of an inspection target that are captured at a plurality of posture angles different from one another, locating a three-dimensional position of the defect candidate based on a two-dimensional position of the defect candidate detected from at least one captured image among the captured images captured at the plurality of posture angles, applying a perspective projection transformation on the three-dimensional position of the defect candidate to acquire a two-dimensional position of the defect candidate for each of the captured images captured at the plurality of posture angles, determining a feature amount regarding the defect candidate based on the two-dimensional position of the defect candidate for each of the captured images captured at the plurality of posture angles, and inspecting the surface of the inspection target using the feature amount regarding the defect candidate.

According to the one aspect of the present invention, inspection accuracy can be improved when an inspection target is inspected by being imaged t a plurality of posture angles.

DESCRIPTION OF EMBODIMENTS

First Embodiment

Figure 1:
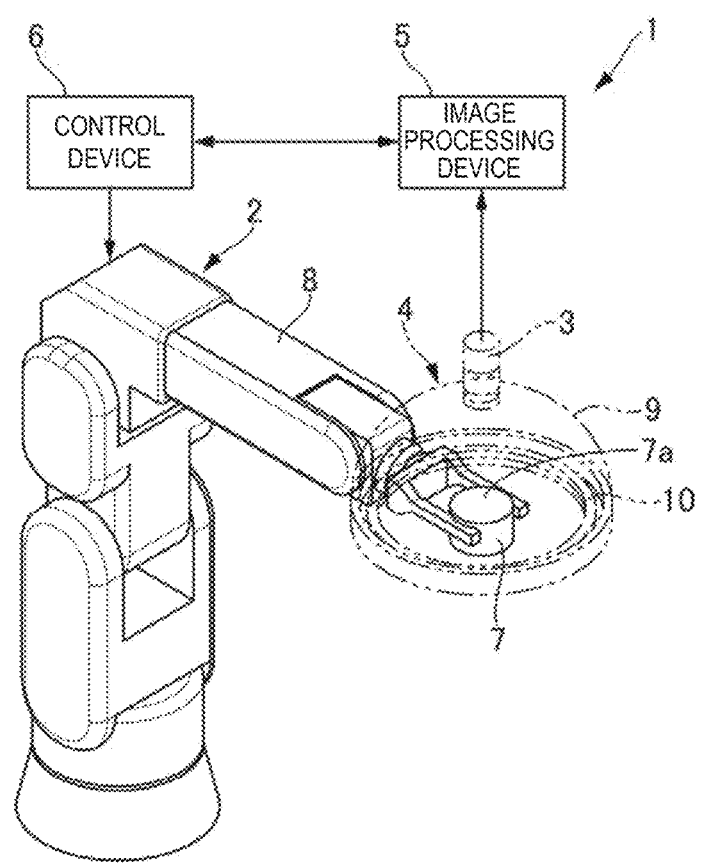
FIG. 1 schematically illustrates a visual inspection apparatus 1 according to a first embodiment.

FIG. 1 schematically illustrates a visual inspection apparatus 1 according to a first embodiment.

The visual inspection apparatus 1 (hereinafter referred to as an inspection apparatus 1) includes a robot 2, a camera (an imaging portion) 3, an illumination device 4, an image processing device (an inspection portion) 5, and a control device (a posture control portion) 6. The robot 2 is an articulated robot, and includes a hand 8. The hand 8 holds an engine piston material or a processed finished product of an engine piston (hereinafter simply referred to as a piston) 7 that is an inspection target. The camera 3 is supported with a lens thereof facing vertically downward. The illumination device 4 irradiates a crown surface 7a of the piston 7 with light, and includes a dome 9 and ring illumination 10. The dome 9 houses the piston 7 and the ring illumination 10 therein. The dome 9 reflects and diffuses the light emitted from the ring illumination 10. The dome 9 is located vertically below the camera 3, and is fixed integrally with the camera 3. The camera 3 images the crown surface 7a of the piston 7 from an opening portion provided at the upper end of the dome 9. The ring illumination 10 is annular LED illumination arranged so as to surround the piston 7. The ring illumination 10 is supported rotatably about the central axis of the camera 3 relative to the camera 3 and the dome 9 by a not-illustrated supporting device.

The image processing device 5 performs image processing of extracting a defect candidate portion from the surface image of the crown surface 7a imaged by the camera 3, and generating, for example, an 8-bit (256 tones) gray-scale image from the defect candidate portion. The control device 6 outputs an instruction for changing an angle of view (a posture angle) of the crown surface 7a of the piston 7 relative to the camera 3 to the robot 2. Further, the control device 6 outputs an instruction for imaging the crown surface 7a to the camera 3. The control device 6 determines whether a defect (a cavity, a scratch, or a dent) is present on the crown surface 7a based on a change in a luminance distribution in a plurality of gray-scale images captured at angles of view different from one another.

Figure 2:
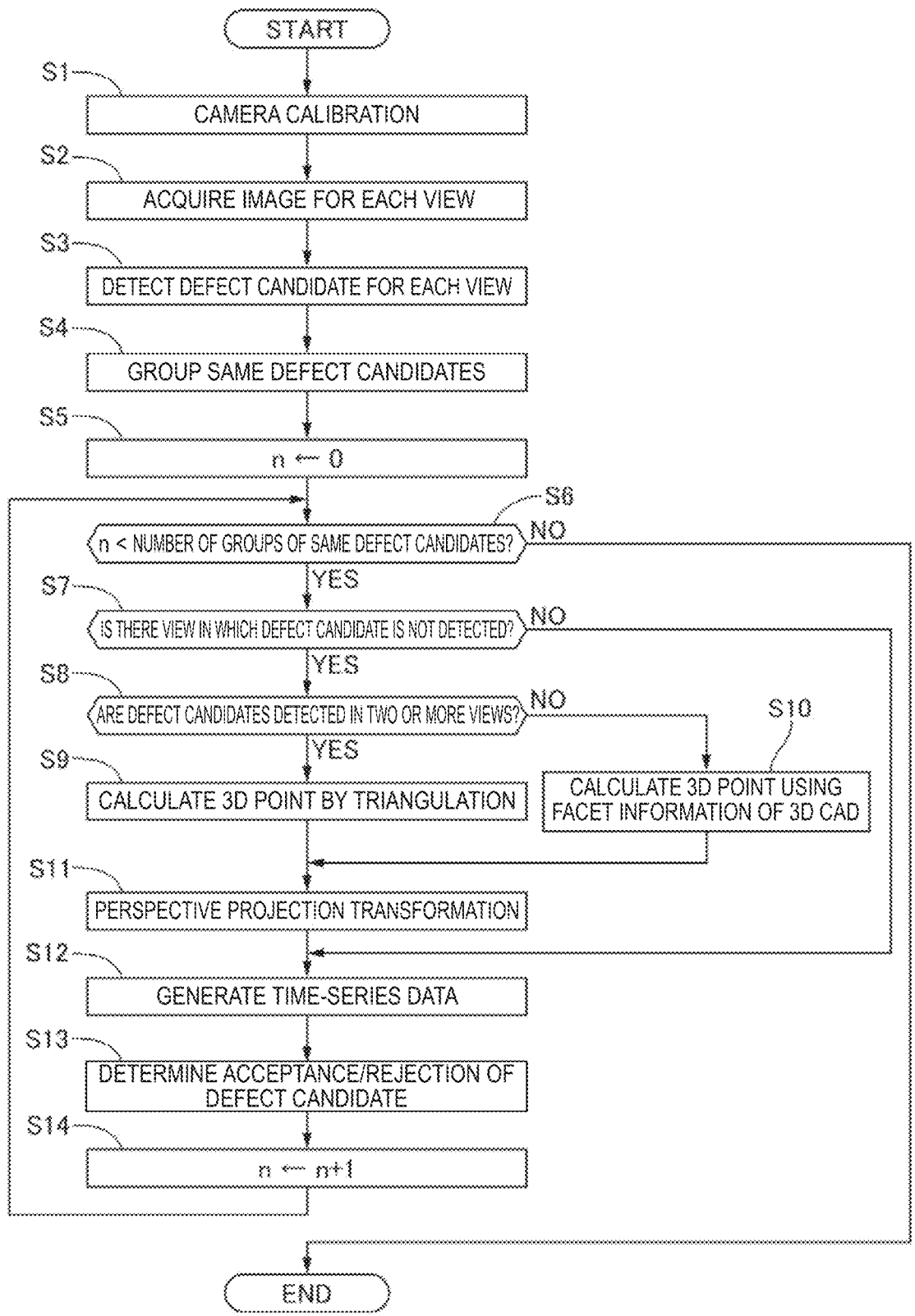
FIG. 2 is a flowchart illustrating a flow of a visual inspection method according to the first embodiment.

FIG. 2 is a flowchart illustrating a flow of a visual inspection method according to the first embodiment.

In step S1, the inspection apparatus 1 carries out camera calibration using a calibration pattern such as a checkerboard, and estimates an intrinsic parameter K, extrinsic parameters (a rotation element $R_N$ and a translation element $T_N$, N=1 to 25), and a distortion coefficient of the camera 3. The intrinsic parameter K is a parameter for a transformation from a camera coordinate system into an image coordinate system, and is dependent on the camera and the lens. The rotation element $R_N$ and the translation element $T_N$ are parameters for a transformation from a world coordinate system into the camera coordinate system, and are dependent on the angle of view. A perspective projection transformation equation $P_N = K(R_N|T_N)$ for transforming a position in the world coordinate system into a position in the image coordinate system is acquired based on the estimation of each of the parameters.

This step is performed only at the first time, and is not performed after the perspective projection transformation equation is acquired.

In step S2, the inspection apparatus 1 acquires 25 captured images (views 1 to 25) by imaging the crown surface 7a at 25 angles while changing the angle of view.

Figure 3:
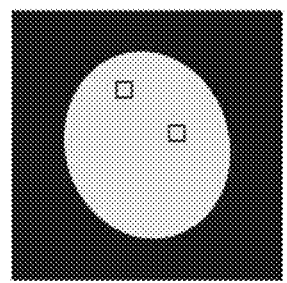
FIG. 3 illustrates detection of a defect candidate for each view using a first AI.
Figure 3:
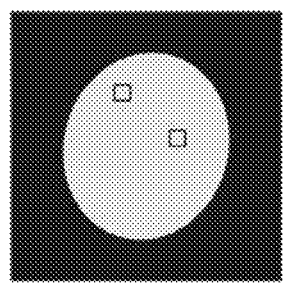
Figure 3:
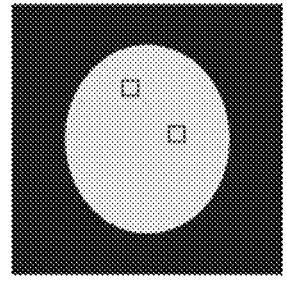
Figure 3:
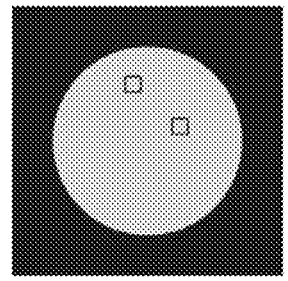

In step S3 (a first step), the inspection apparatus 1 detects a defect candidate for each of the views (the view 1 to the view 25) using a first AI as illustrated in FIG. 3.

Figure 4:
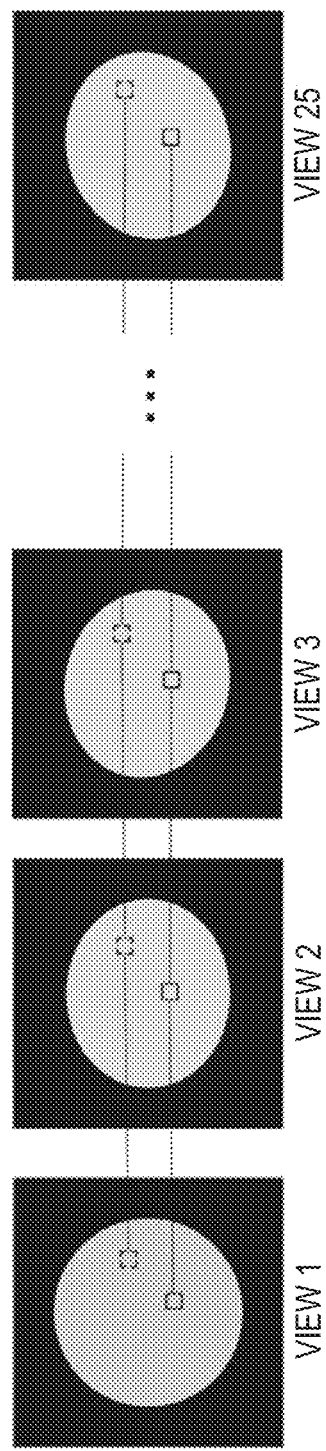
FIG. 4 illustrates grouping of the same defect candidates in the respective views.

In step S4, the inspection apparatus 1 groups the same defect candidates in the respective views as illustrated in FIG. 4. Defect candidates gathered at a distance close to one another (located close to one another in the image coordinate system) are handled as the same defect candidates.

In step S5, 0 is assigned to a first variable n.

In step S6, the inspection apparatus 1 determines whether the first variable n is smaller than the number of groups of the same defect candidates. If the determination in step S6 is YES, the processing proceeds to step S7. If the determination in step S6 is NO, the present control is ended. For example, in the case of FIG. 4, the number of groups of the same defect candidates is 2, and therefore the inspection apparatus 1 determines whether the first variable n is smaller than 2.

In step S7, the inspection apparatus 1 determines whether there is a view in which the defect candidate is not detected among the views 1 to 25. If the determination in step S7 is YES, the processing proceeds to step S8. If the determination in step S7 is NO, the processing proceeds to step S12.

In step S8, the inspection apparatus 1 determines whether the defect candidates are detected in two or more views. If the determination in step S8 is YES, the processing proceeds to step S9. If the determination in step S8 is NO, the processing proceeds to step S10.

Figure 5:
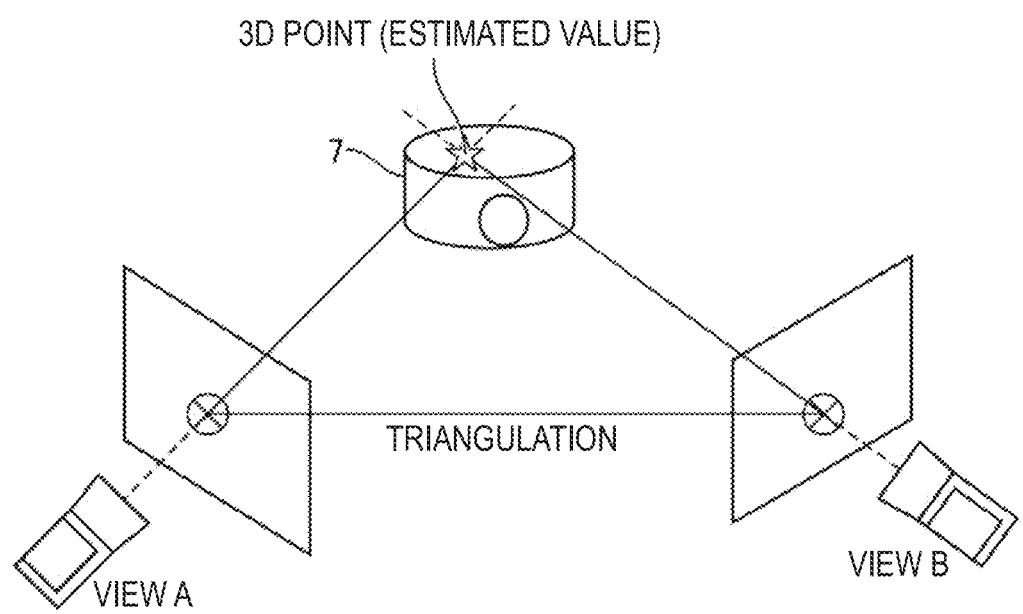
FIG. 5 illustrates a method of estimating a 3D point of the defect candidate using triangulation.

In step S9 (a second step), the inspection apparatus 1 calculates a 3D point (x, y, z) of the defect candidate in the world coordinate system using triangulation. More specifically, as illustrated in FIG. 5, the inspection apparatus 1 estimates the 3D point of this defect using the triangulation technique based on 2D points (x, y) in the image coordinate system that indicate the same defects displayed in two arbitrary views A and B in which the defect candidates are detected.

Figure 6:
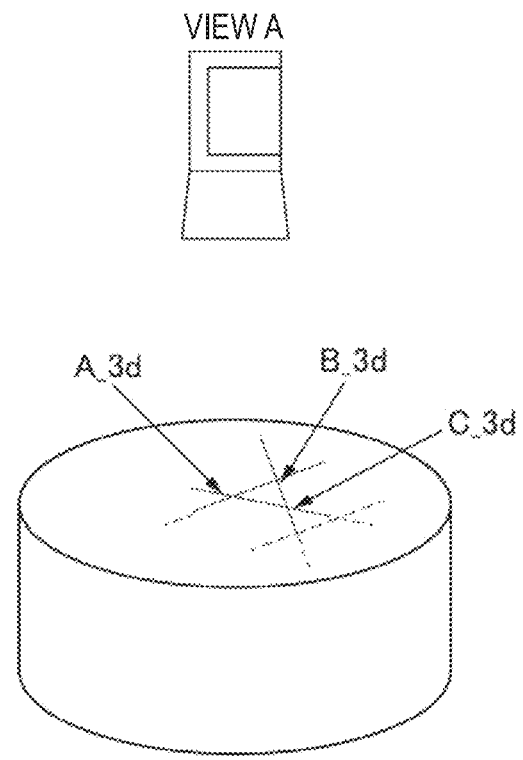
FIG. 6 illustrates a method of estimating the 3D point of the defect candidate using facet information of a piston 7.

In step S10 (the second step), the inspection apparatus 1 calculates the 3D point of the defect candidate using facet information in STL data of 3D CAD used when the piston 7 is designed. More specifically, the inspection apparatus 1 rotates 3D CAD of the piston 7 and generates 2D meshes of 25 points of view by perspective projection transformation in advance, and superimposes the 2D mesh of the point of view corresponding to the arbitrary view A in which the defect candidate is detected and estimates the 3D point in the world coordinate system based on facet numbers A_3d (xA, yA, zA), B_3d (xB, yB, zB), and C_3d (xC, yC, zC) containing the defect displayed in the view A as illustrated in FIG. 6. The 3D point of this defect can be calculated based on the distances from the 3 points A_3d, B_3d, and C_3d.

In step S11 (a third step), the inspection apparatus 1 performs the perspective projection transformation of transforming the 3D point in the world coordinate system that has been calculated in step S9 or S10 into a 2D point (x, y) in the image coordinate system in the view in which the defect candidate is not detected using the perspective projection transformation equation $P_N = K(R_N|T_N)$ acquired from the camera calibration in step S1.

Figure 7:
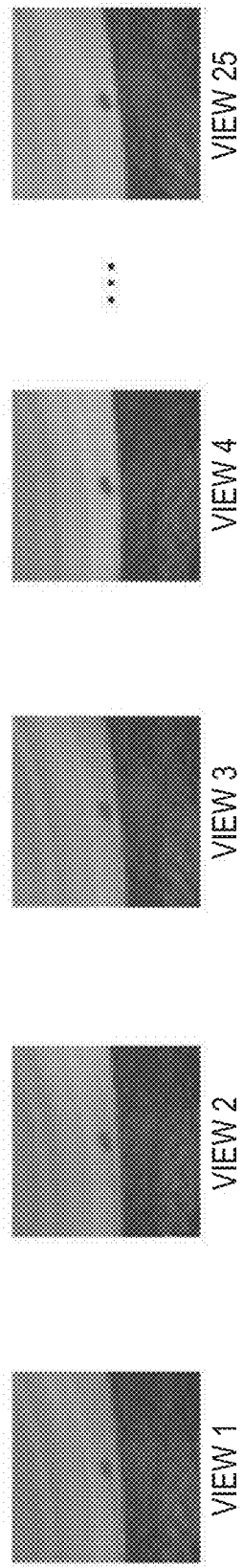
FIG. 7 illustrates an image around the same defect candidate in each view.
Figure 8:
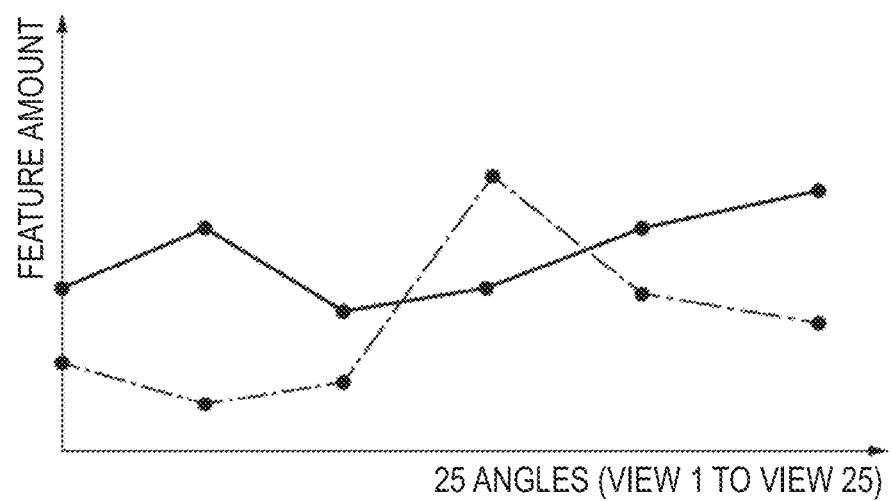
FIG. 8 illustrates time-series data of a feature amount in each view.

In step S12, the inspection apparatus 1 cuts out images around the same defect candidates in the respective views as illustrated in FIG. 7, and, along therewith, generates time-series data of a feature amount (contrast) that is ordered in correspondence with the plurality of different posture angles from the respective images around the same defect candidates as illustrated in FIG. 8.

In step S13 (a fourth step), the inspection apparatus 1 determines acceptance/rejection of the defect using a second AI. For example, if there is a defect (a cavity, a scratch, or a dent) φ0.3 mm or larger, the inspection apparatus 1 determines that the piston 7 is faulty and removes this piston 7 from the line.

In step S14, the inspection apparatus 1 increments the first variable n. After incrementing the first variable n, the inspection apparatus 1 switches the defect candidate to determine the acceptance/rejection.

Next, verification is attempted to clarify whether how the view images are selected affects the accuracy of estimating the defect position when the two arbitrary views in which the defect candidates are detected are selected to calculate the 3D point of the defect candidate in the world coordinate system using the triangulation.

Figure 9:
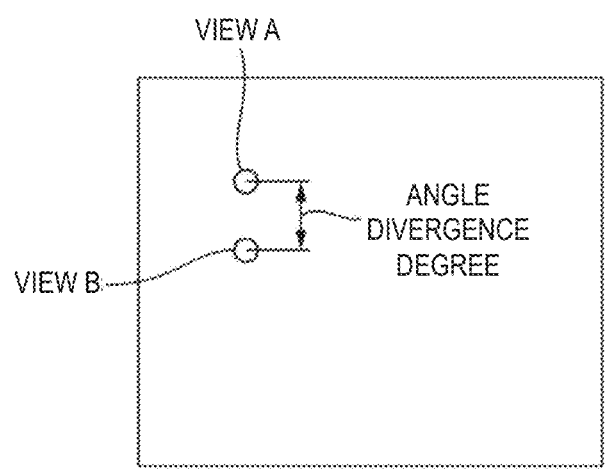
FIG. 9 illustrates an angle divergence degree between the defect candidates when two captured images are superimposed.

The crown surface 7a of the piston 7 is imaged at 25 angles, and 25 captured images (views 1 to 25) are acquired. When two arbitrary captured images among these views are superimposed, the same defect candidates appear at different positions in the image due to the angle at the time of the imaging as illustrated in FIG. 9. Defining that a distance

Figure 10:
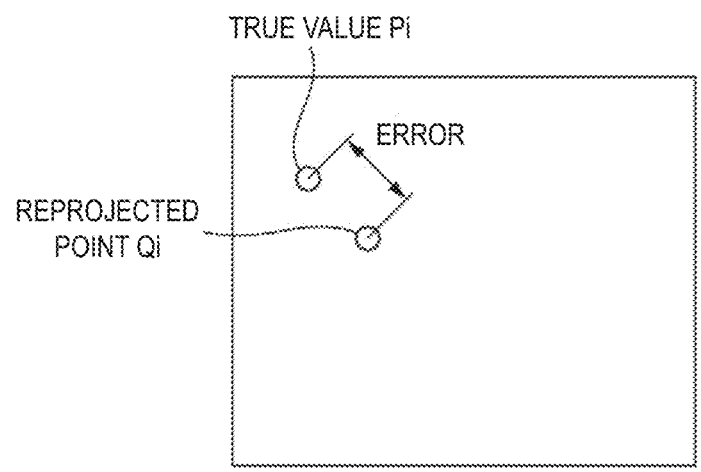
FIG. 10 illustrates an error between a true value and a reprojected point of the defect candidate in one captured image.

[pixel] between these two defect candidates will be referred to as an angle divergence degree, the angle divergence degree between some view and each of the remaining 24 views is measured. Further, as illustrated in FIG. 10, a mean value (Mean) [pixel] and a standard deviation (Std) [pixel] of the distance between the position of the same defect candidate displayed in each of the 25 views (a true value Pi) and the position of the defect candidate estimated by the triangulation (a reprojected point Qi) are calculated, and a correlation between the positional relationship between the two lines of sight (views) and the position estimation accuracy is studied. The mean (a bias index) is calculated using the following equation.

$$\text{Mean} = \frac{1}{N}\sum_{i=0}^{N}(P_i - Q_i) = \frac{1}{N}\sum_{1}^{N}D_i \quad \text{[Equation 1]}$$
$$= \frac{1}{N}\sum_{i=0}^{N}\sqrt{\{(x_i^P - x_i^Q)^2 + (y_i^P - y_i^Q)^2\}}$$

Further, the standard deviation (a variance index) is calculated using the following equation.

$$\text{Standard Deviation} = \sqrt{\frac{1}{N-1}\sum_{1}^{N}(D_i - \overline{D_i})^2} \quad \text{[Equation 2]}$$

Figure 11:
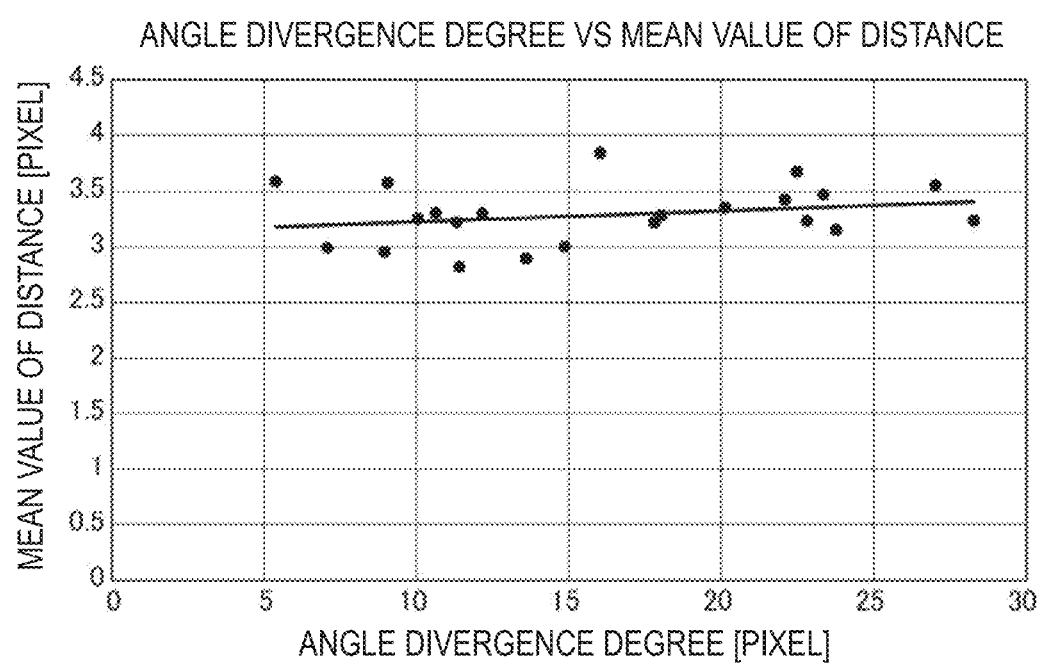
FIG. 11 is a graph indicating the relationship between the angle divergence degree and the mean value of the distance.
Figure 12:
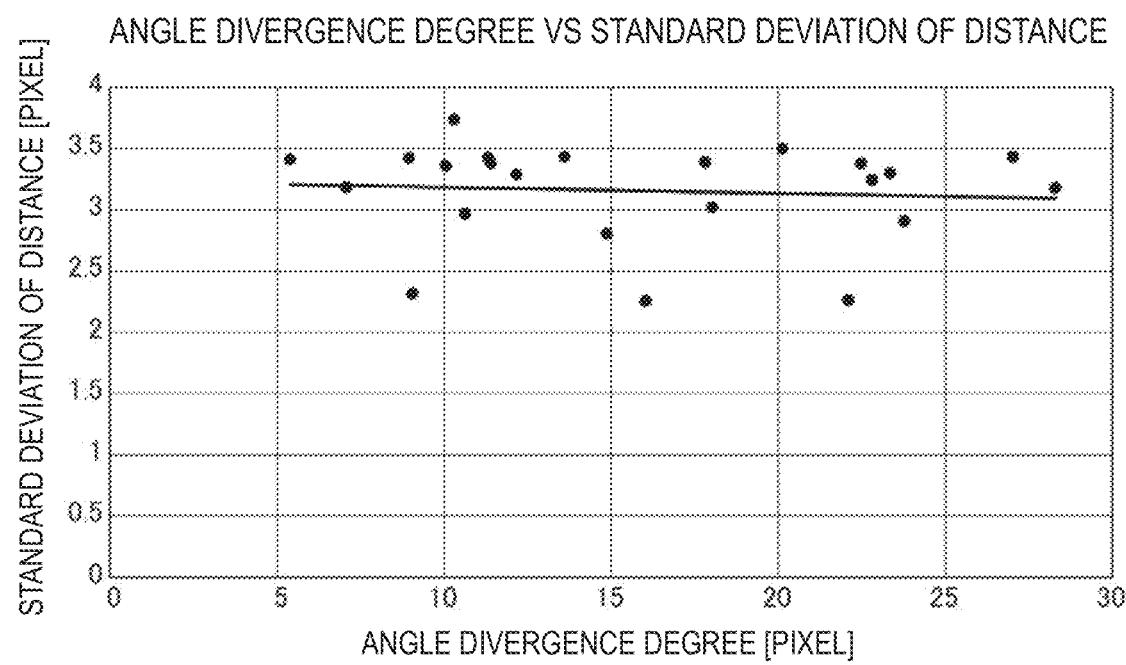
FIG. 12 is a graph indicating the relationship between the angle divergence degree and the standard deviation of the distance.

FIGS. 11 and 12 illustrate a result of the verification. FIG. 11 is a graph indicating the relationship between the angle divergence degree and the mean value of the distance, and FIG. 12 is a graph indicating the relationship between the angle divergence degree and the standard deviation of the distance. As seen from FIGS. 11 and 12, no clear correlation can be found between the difference in how the defect candidates are viewed in the selected two views (the angle divergence degree), and the mean value and the standard deviation of the distance between the true value and the reprojected point of the defect position. As a result, it can be confirmed that how the view images are selected does not affect the accuracy of estimating the defect position. This means that any view may be selected among views in which the defect candidates are detected when the 3D point of the defect candidate is estimated using the triangulation in step S6.

Next, functions and advantageous effects of the first embodiment will be described.

Figure 13:
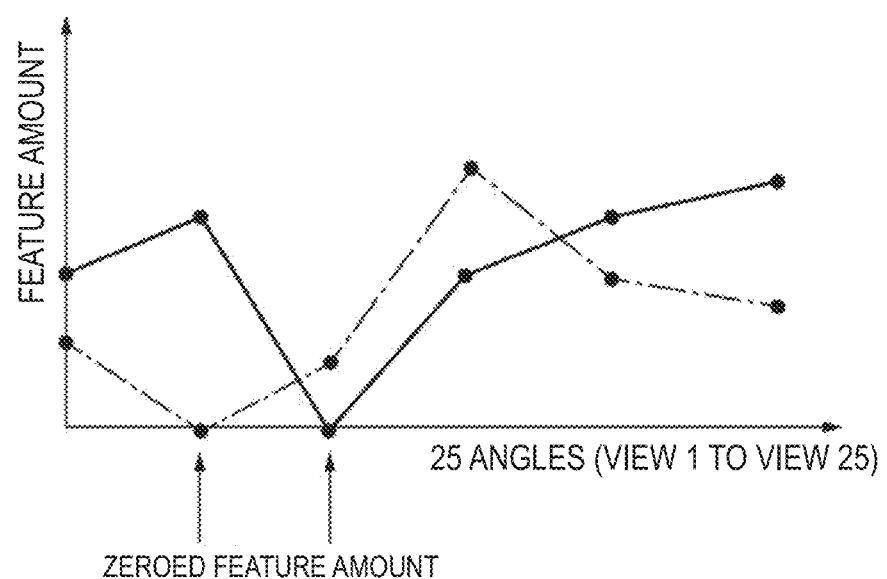
FIG. 13 illustrates time-series data of the feature amount in each view that includes a feature amount replaced with zero.

When the surface of the inspection target is imaged at a plurality of posture angles, the same defect candidates are grouped from the respective captured images, and the inspection target is inspected based on the feature amount, the feature amount is replaced with zero as illustrated in FIG. 13 if there is a captured image in which the defect candidate is not detected. An increase in the number of data points with the feature amount thereof replaced with zero may make it difficult to distinguish the defect and false information, resulting in a reduction in the inspection accuracy.

On the other hand, the present invention calculates the 2D point of the defect candidate in the captured image in which the defect candidate is not detected using the first AI by applying the perspective projection transformation on the 3D point of the defect candidate that is determined based on the 2D point of the defect candidate detected from at least one captured image. This can ensure that the same defect candidates are grouped across the 25 angles, thereby allowing a missing feature amount to be complemented and allowing the defect and the false information to be easily distinguished. As a result, the inspection accuracy can be improved when the piston 7 set as the inspection target is imaged at a plurality of posture angles and a defect on the crown surface 7a is inspected.

When the 2D point is calculated by applying the perspective projection transformation on the 3D point, the perspective projection transformation equation $P_N=K(R_N|T_N)$ prepared in advance is used. Using an arithmetic equation facilitates a quick and easy calculation of the 2D point of the defect candidate. Further, the perspective projection transformation equation is set based on the intrinsic parameter and the extrinsic parameters of the camera 3, thereby allowing the 2D point of the defect candidate to be accurately estimated.

The 3D point of the defect candidate is determined by the method based on the triangulation using the 2D points of the defect candidates detected from two arbitrary captured images among the captured images acquired at the plurality of different posture angles. As long as the 2D points of the defect candidates can be detected in captured images captured at two different posture angles, the distance to the defect candidate can be identified based on the triangulation principle, and therefore the 3D point of the defect candidate can be accurately estimated.

The 3D point of the defect candidate is determined by the method based on the facet number of the three-dimensional data corresponding to the piston 7 using the 2D point of the defect candidate detected from one arbitrary captured image among the captured images acquired at the plurality of different posture angles. The 2D point of the defect candidate displayed in the captured image is located in a facet or between facets, and the three-dimensional position of each facet can be correctly detected from the STL data of 3D CAD. Therefore, as long as the 2D point of the defect candidate displayed in one captured image can be acquired, the 3D point of the defect candidate can be estimated based on the facet information.

The feature amount regarding the defect candidate is time-series data ordered in correspondence with the plurality of different posture angles.

Second Embodiment

A second embodiment has a basic configuration similar to the first embodiment, and therefore will be described focusing on only differences from the first embodiment.

Figure 14:
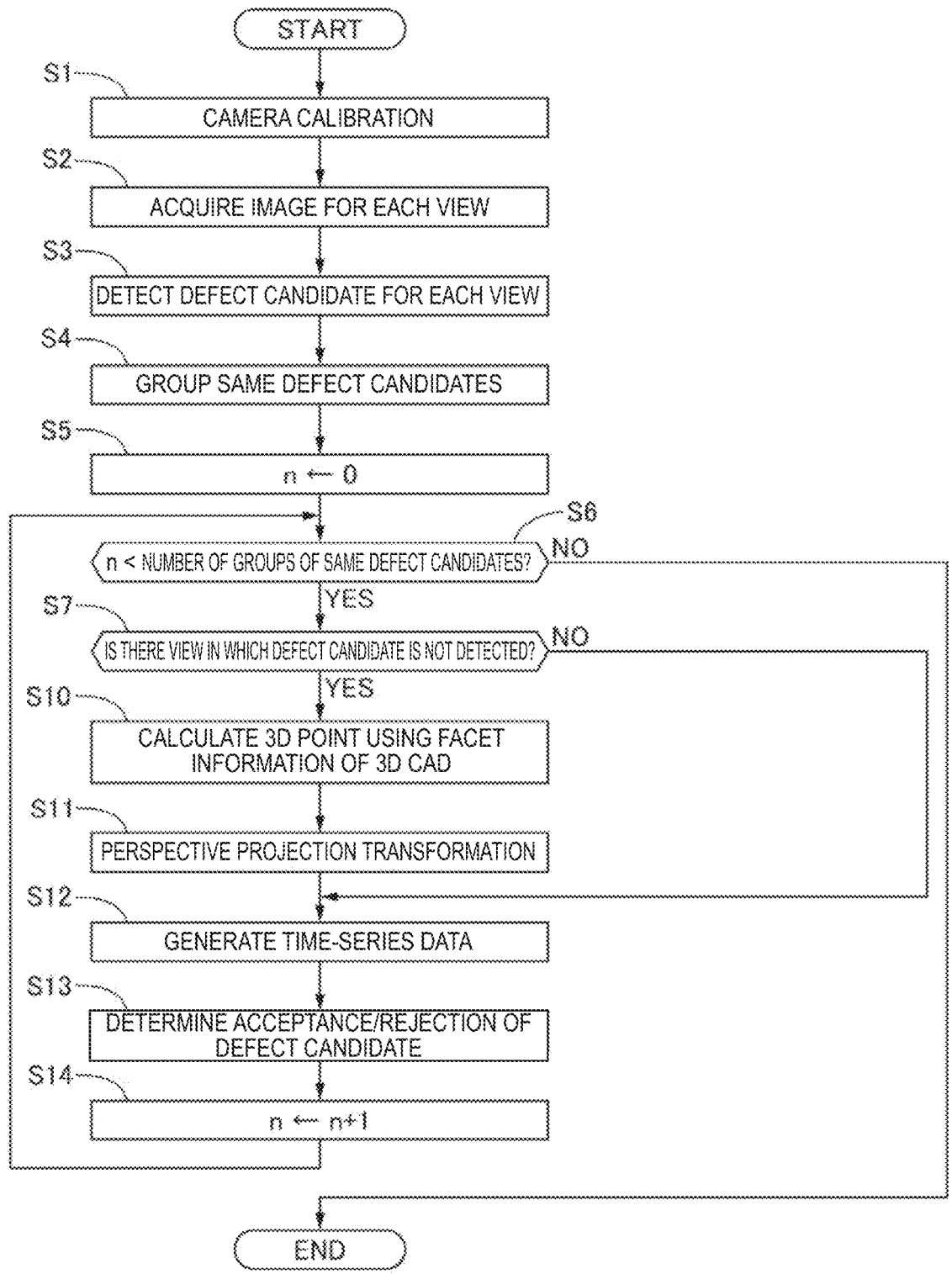
FIG. 14 is a flowchart illustrating a flow of a visual inspection method according to a second embodiment.

FIG. 14 is a flowchart illustrating a flow of a visual inspection method according to a second embodiment. The visual inspection method according to the second embodiment is different from the first embodiment in terms of estimating the 3D point of the defect candidate using only the facet information in the STL data of the piston 7 without using the triangulation.

Third Embodiment

A third embodiment has a basic configuration similar to the first embodiment, and therefore will be described focusing only on differences from the first embodiment.

Figure 15:
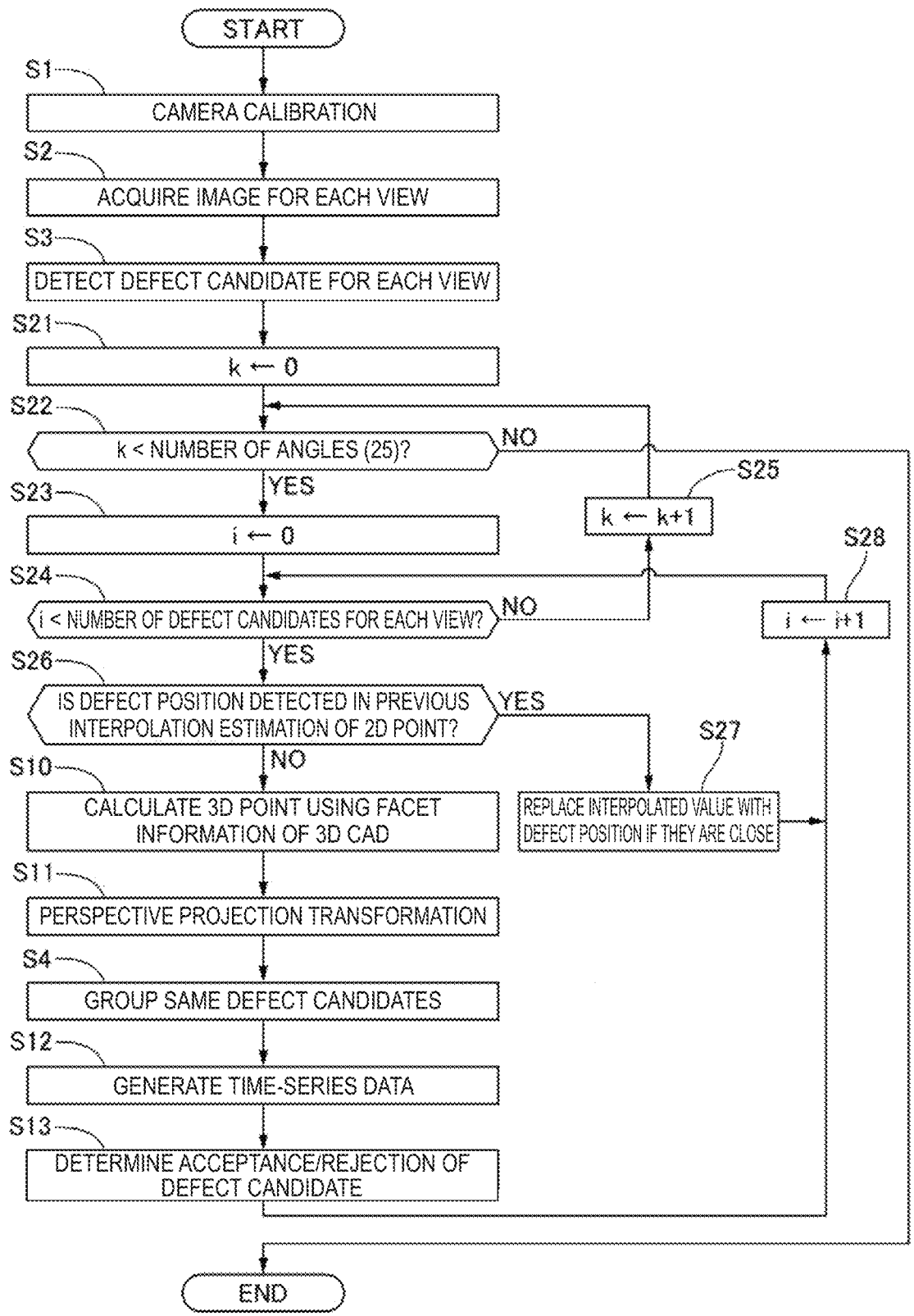
FIG. 15 is a flowchart illustrating a flow of a visual inspection method according to a third embodiment.

FIG. 15 is a flowchart illustrating a flow of a visual inspection method according to a third embodiment. The visual inspection method according to the third embodiment is different from the first embodiment in terms of grouping the same defect candidates in the respective views after the perspective projection transformation.

In step S21, 0 is assigned to a second variable k.

In step S22, the inspection apparatus determines whether the second variable k is smaller than the number of angles (the number of views), which is 25. If the determination in step S22 is YES, the processing proceeds to step S23. If the determination in step S22 is NO, the present control is ended.

In step S23, 0 is assigned to a third variable i.

In step S24, the inspection apparatus determines whether the third variable i is smaller than the number of defect candidates for each of the views. If the determination in step S24 is YES, the processing proceeds to step S26. If the determination in step S24 is NO, the processing proceeds to step S25.

In step S25, the inspection apparatus increments the second variable k. After incrementing the second variable k, the inspection apparatus switches a view to interpolate an undetected defect candidate therein.

The inspection apparatus switches the angle (the view).

In step S26, the inspection apparatus determines whether the defect position is detected in the previous interpolation estimation of the 2D point. If the determination in step S26 is YES, the processing proceeds to step S27. If the determination in step S26 is NO, the processing proceeds to step S10.

In step S27, if the actually measured point of the defect position is close to the interpolated value (the 2D estimated point), the estimated point is replaced with the actually measured point (the actually measured value is adopted).

In step S28, the inspection apparatus increments the third variable i. After incrementing the third variable i, the inspection apparatus switches the defect candidate to determine the acceptance/rejection.

In the visual inspection method according to the third embodiment, the inspection apparatus groups the same defect candidates after the perspective projection transformation, and therefore compares the actually measured point of the defect candidate for each of the views with the previously estimated estimation value and determines that the actually measured point is the 2D point of the defect candidate if the position of the actually measured point is close to the estimated point. In the case where the same defect candidates are grouped before the perspective projection transformation, the same defect candidates can be easily grouped because being gathered at a close distance to one another to form a group in the image if the imaging track of the camera matches a conical movement. However, in a case of another imaging track, the groping may be complicated. On the other hand, the third embodiment has a merit of being able to support various imaging tracks by grouping the same defect candidates after the perspective projection transformation.

Other Embodiments

Having described the embodiments for implementing the present invention, the specific configuration of the present invention is not limited to the configurations of the embodiments, and the present invention also includes even a design modification and the like thereof made within a range that does not depart from the spirit of the present invention.

For example, the inspection target is not limited to the piston.

The present invention shall not be limited to the above-described embodiments, and includes various modifications. For example, the above-described embodiments have been described in detail to facilitate a better understanding of the present invention, and the present invention shall not necessarily be limited to the configuration including all of the described features. Further, a part of the configuration of some embodiment can be replaced with the configuration of another embodiment. Further, some embodiment can also be implemented with a configuration of another embodiment added to the configuration of this embodiment. Further, each embodiment can also be implemented with another configuration added, deleted, or replaced with respect to a part of the configuration of this embodiment.

The present application claims priority under the Paris Convention to Japanese Patent Application No. 2021-138469 filed on Aug. 27, 2021. The entire disclosure of Japanese Patent Application No. 2021-138469 filed on Aug. 27, 2021 including the specification, the claims, the drawings, and the abstract is incorporated herein by reference in its entirety.

REFERENCE SIGN LIST 1 visual inspection apparatus
3 camera (imaging portion)
5 image processing device (inspection portion)
6 control device (posture control portion)
7 piston (inspection target)

The invention claimed is:

1. A visual inspection apparatus comprising:
an imaging portion configured to image a surface of an inspection target;
a posture control portion configured to change a posture of the inspection target relative to the imaging portion; and
an inspection portion configured to inspect the surface of the inspection target,
wherein the inspection portion
detects a defect candidate for each of captured images of the surface of the inspection target that are captured at a plurality of posture angles different from one another,
locates a three-dimensional position of the defect candidate based on a two-dimensional position of the defect candidate detected from at least one captured image among the captured images captured at the plurality of posture angles,
applies a perspective projection transformation on the three-dimensional position of the defect candidate to acquire a two-dimensional position of the defect candidate for each of the captured images captured at the plurality of posture angles,
determines a feature amount regarding the defect candidate based on the two-dimensional position of the defect candidate for each of the captured images captured at the plurality of posture angles, and
inspects the surface of the inspection target using the feature amount regarding the defect candidate.

2. The visual inspection apparatus according to claim 1, wherein the perspective projection transformation is performed using a perspective projection transformation equation prepared in advance.

3. The visual inspection apparatus according to claim 2, wherein the three-dimensional position of the defect candidate is located using triangulation on the two-dimensional positions of the defect candidates detected from two arbitrary captured images among the captured images captured at the plurality of posture angles.

4. The visual inspection apparatus according to claim 2, wherein the three-dimensional position of the defect candidate is located by applying facet information in three-dimensional data corresponding to the inspection target on the two-dimensional position of the defect candidate detected from one arbitrary captured image among the captured images captured at the plurality of posture angles.

5. The visual inspection apparatus according to claim 1, wherein the feature amount regarding the defect candidate is time-series data ordered in correspondence with the plurality of posture angles.

6. A visual inspection method of inspecting a surface of an inspection target by an imaging portion configured to image the surface of the inspection target, a posture control portion configured to change a posture of the inspection target relative to the imaging portion, and a computer, the visual inspection method comprising:
- a first step of detecting a defect candidate for each of captured images of the surface of the inspection target that are captured at a plurality of posture angles different from one another;
- a second step of locating a three-dimensional position of the defect candidate based on a two-dimensional position of the defect candidate detected from at least one captured image among the captured images captured at the plurality of posture angles;
- a third step of applying a perspective projection transformation on the three-dimensional position of the defect candidate to acquire a two-dimensional position of the defect candidate for each of the captured images captured at the plurality of posture angles; and
- a fourth step of inspecting the surface of the inspection target using a feature amount regarding the defect candidate, the feature amount being determined based on the two-dimensional position of the defect candidate for each of the captured images captured at the plurality of posture angles.

7. The visual inspection method according to claim 6, wherein the perspective projection transformation is performed using a perspective projection transformation equation prepared in advance.

* * * * *